United States Patent [19]

Conn

[11] Patent Number: 4,529,153
[45] Date of Patent: Jul. 16, 1985

[54] ONE-PIECE LOAD LINE POCKET FOR BALLOON

[75] Inventor: Sidney H. Conn, Statesville, N.C.

[73] Assignee: The Balloon Works, Inc., Statesville, N.C.

[21] Appl. No.: 510,579

[22] Filed: Jul. 5, 1983

[51] Int. Cl.³ .............................................. B64B 1/58
[52] U.S. Cl. ..................................... 244/126; 244/145
[58] Field of Search ................ 244/142, 145, 126, 31, 244/33, 127

[56] References Cited

U.S. PATENT DOCUMENTS

| | | | |
|---|---|---|---|
| 1,849,965 | 3/1932 | Switlik | 244/145 |
| 2,419,829 | 4/1947 | Frain | 244/145 |
| 2,960,282 | 11/1960 | Winzen | 244/31 |
| 3,240,451 | 3/1966 | Sepp, Jr. | 244/145 |
| 3,285,546 | 11/1966 | Jalbert | 244/145 |
| 4,390,149 | 6/1983 | Barnes et al. | 244/31 |

FOREIGN PATENT DOCUMENTS 337133  5/1921  Fed. Rep. of Germany .

Primary Examiner—Galen L. Barefoot
Attorney, Agent, or Firm—W. Thad Adams, III

[57] ABSTRACT

A one-piece load line pocket (30) is disclosed for a hot air balloon (10). The load line pocket comprises an elongate fabric tape having a pair of opposing, longitudinally extending shoulders (31, 32). One of the pair of shoulders is adapted to be placed in overlapping relation, respectively, with an adjacent balloon envelope gore (24) and stitched thereto. The gores (24) are secured together in closely adjacent relation to each other but free of any direct interconnection therebetween. The tape also has a longitudinally extending, tubular pocket (34) intermediate to and integrally formed with the pair of shoulders (31, 32) for freely enclosing a load line (18) which extends from the top to the bottom of the balloon envelope (11) for supporting a balloon carriage (16).

6 Claims, 6 Drawing Figures

ONE-PIECE LOAD LINE POCKET FOR BALLOON

TECHNICAL FIELD AND BACKGROUND OF THE INVENTION

This invention relates to a one-piece load line pocket for a balloon, such as a hot air sport balloon or the like. The load line pocket is characterized by resisting tears from one panel to the next and facilitating easy stitching of adjacent balloon gores together. In addition, the load line pocket provides a strong, uniform structure within which to insert the balloon load lines.

Hot air sport balloons include a generally spherical balloon envelope having a downwardly directed mouth on its lower end. A carriage is mounted below the mouth of the envelope by load lines. The carriage supports the pilot and any passengers as well as a gas burner assembly which heats air and propels it through the mouth into the envelope.

Some balloons include an opening at the apex of the balloon. The apex opening is covered by circular valve panels which are controllable by the pilot to selectively cover and uncover the opening. In this way, controlled venting of the envelope is permitted.

Hot air balloon envelopes are typically formed of a plurality of four-sided fabric panels which are interconnected to form a number of vertical gores which extend from the mouth to the apex opening. The gores are joined together side by side to form the sphere-like structure. Conventional prior art balloons have gores which are connected together directly by means of a lap seam utilizing a two-thread locking stitch. This structure has been improved upon significantly by a prior development of the present applicant/assignee in patent application Ser. No. 258,615 entitled "Balloon Envelope." In the '615 application an inflatable balloon envelope is formed by a latticework of interconnected tapes including a plurality of vertical tapes which divide the envelope into several vertically disposed gores. A plurality of laterally directed tapes extend between the vertical tapes within each gore in such manner that the vertical tapes and laterally directed tapes collectively define a plurality of open areas covered by lightweight, air-impermeable sheet material. Each of the vertical tapes is composed of a pair of like tape components which have partially overlapping portions and adjacent non-overlapping portions. Laterally spaced-apart seams extend through the overlapping portions to interconnect the tape components and at the same time define a pocket between the two tape components within which the load line is freely extended. Thus, the load line pocket is formed by laterally spaced-apart seams. Furthermore, the tape components themselves are stitched to adjacent panels by stitching through the non-overlapping portions of the adjacent tape components.

Balloon panels are by necessity very lightweight and hence are succeptible to tearing, especially as a result of contact with ground objects during landing. One of the features of the invention described in the '615 application is the ability of the structure to prevent a tear in one fabric panel from continuing across a seam to an adjacent panel either within the same gore or to an adjacent gore. As described above, the load line pocket intermediate each gore is constructed by a series of parallel lines of stitching.

First, these rows of stitching are formed individually, meaning that a substantial amounts of time and labor are involved since each balloon gore is relatively long. Even a slight flaw in the row of stitching often requires that the entire row be pulled out and sewn again. This, of course, requires even more time and labor and can affect the strength of the tape components and the balloon fabric from which the panels are constructed.

Secondly, the load line pocket must be constructed with extreme care so that it will be of an exact and uniform volume and width since the load line must be positioned for free movement within the pocket. Therefore, there is a close tolerance within which the dimensions of the load line pocket must fall. A load line pocket which is constructed too small makes it difficult to pass the load line through the pocket, and at the restricted point, causes abrasion which over time can cause a safety-related defect in the balloon envelope.

SUMMARY OF THE INVENTION

Therefore, it is an object of the invention to provide a one-piece load line pocket for a balloon.

It is another object of the present invention to provide a one-piece load line pocket for a balloon which can also serve as a joining structure between adjacent balloon gores.

It is another object of the present invention to provide a one-piece load line pocket which substantially reduces the time and labor involved in connecting adjacent balloon gores together.

It is yet another object of the present invention to provide a one-piece load line pocket which resists tearing from one panel to another panel on an adjacent gore.

It is still another object of the present invention to provide a one-piece load line pocket which makes inserting load lines into the pockets substantially quicker and easier.

It is another object of the present invention to provide a one-piece load line pocket which is provided with a longitudinally extending, tubular pocket integrally formed without sewing stitches.

These and other objects and advantages of the present invention are achieved in the preferred embodiment of the load line pocket described below by providing a one-piece load line pocket for a balloon of a type constructed of a plurality of relatively lightweight fabric gores collectively defining a generally spherical balloon envelope. The load line pocket comprises an elongate fabric tape generally coextensive in length with the fabric gores defining the balloon envelope. The tape has a pair of opposed, longitudinally extending shoulders. One of the pair of shoulders is adapted to be placed in an overlapping relation, respectively, with an adjacent balloon envelope gore and stitched thereto along the length of the gore, thereby securing the gores in a closely adjacent relation to each other, but free of any direct interconnection. The elongate fabric tape also has a longitudinally extending, tubular pocket intermediate to and integrally formed with the pair of shoulders for freely enclosing a load line which extends from the top to the bottom of the balloon for supporting the balloon carriage.

According to a preferred embodiment of the invention, the tape comprises woven yarns wherein the filling yarns extend cross-wise of the tape from one side edge of the tape to the other side edge of the tape.

Preferably, the tape comprises a flat-type double face weave with binding yarns securing two faces together on its laterally opposed sides to define the extending shoulders. Binding yarns do not secure the two faces together intermediate the shoulders so that a tubular pocket is defined. Use of the structure according to the present invention permits load lines to be easily and quickly inserted in and removed from the load line pockets whether or not secured to the gores, and with no stitching. Also, destructive tearing of the gores is isolated on one panel by providing no interconnection between adjacent gores.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 1:
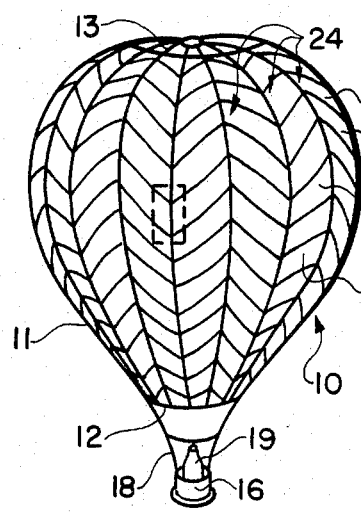
FIG. 1 is a perspective view of a hot air balloon embodying features according to one embodiment of the present invention.

Referring now specifically to the drawings, FIG. 1 illustrates a hot air sport balloon indicated at broad reference numeral 10 which embodies the invention according to this application. The balloon includes an envelope 11 of a generally spherical configuration when inflated. The envelope 11 also includes an open mouth 12 at the bottom of the envelope and an upper end or apex 13 at the opposing, top end.

Balloon 10 also includes a carriage 16 which is mounted immediately below mouth 12 of envelope 11. Carriage 16 is suspended from envelope 11 by means of a plurality of load lines 18 which extend vertically along the extent of envelope 11. In addition, carriage 16 carries a gas burner apparatus 19 for heating air and propelling it into the envelope 11 through mouth 12. The lift created by the relatively warm air within envelope 11 causes balloon 10 to rise.

Figure 6:
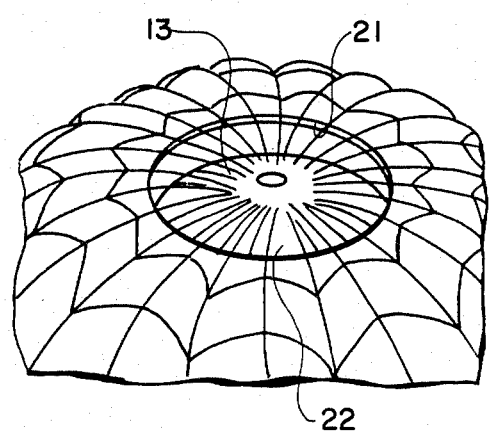

An enlarged view of the upper portion of envelope 11 is shown in FIG. 6. The upper end 13 includes a relatively large circular opening 21 and a circular valve panel 22 which is mounted within the envelope 11 directly beneath opening 21. Panel 21 can be manipulated to selectively cover and uncover opening 21 thus permitting controlled release of warm air causing the balloon 10 to descend at a regulated rate.

Referring again to FIG. 1, envelope 11 is constructed of a plurality of lightweight fabric gores 24. The gores 24 are assembled together and when expanded collectively define a generally spherical configuration.

The gores 24 are in turn formed of panels 26 which are connected by means of fabric strips 28. Typically the fabric panels 26 are connected to the strips 28 by means of two rows of parallel, two thread zig-zag locking stitches 29.

Figure 5:
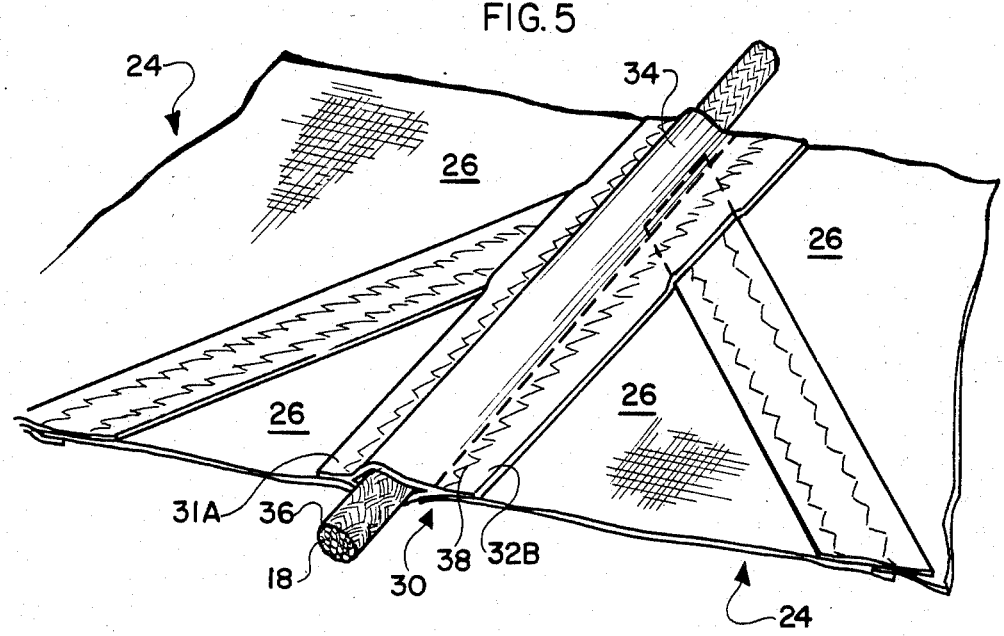
FIG. 5 is a perspective view of a portion of the envelope illustrating the connection between adjacent gores by means of the load line pocket; and, FIG. 6 is a fragmentary perspective view of the apex of the balloon shown in FIG. 1.

Adjacent gores 24 are connected together along their entire length by means of a load line pocket 30 according to the present invention. Load line pocket 30 is best shown in FIG. 5 and comprises a woven tape having a pair of opposing, longitudinally extending shoulders 31 and 32, and a longitudinally extending, tubular pocket 34 intermediate to and integrally formed with shoulders 31 and 32. Still referring to FIG. 5, one of the previously referred to load lines 18 is positioned within tubular pocket 34 for free movement therein.

Figure 2:
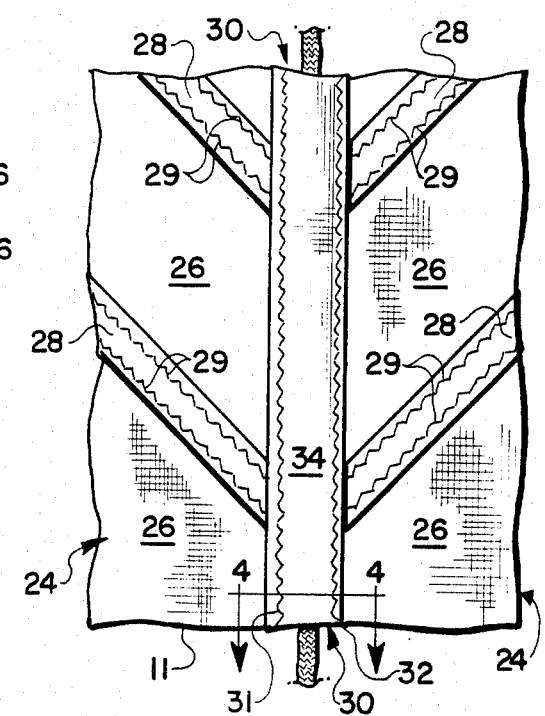
FIG. 2 is an enlarged view of the portion of the balloon envelope indicated at the area 2 in FIG. 1.
Figure 3:
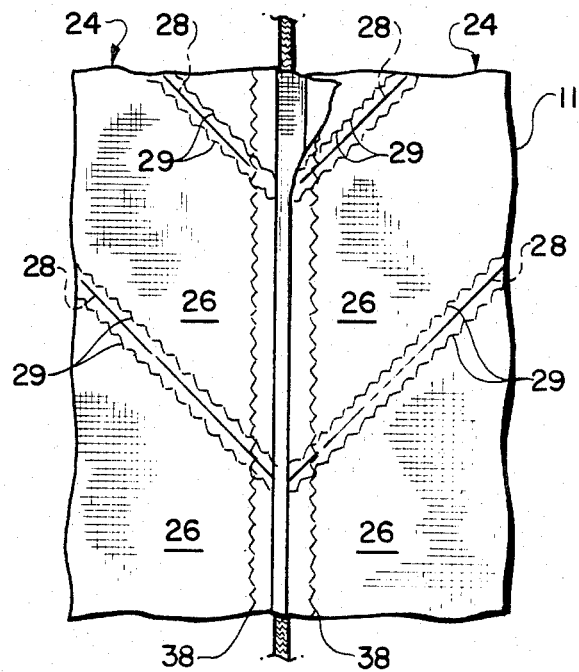
FIG. 3 is a view of the obverse side of the portion of the envelope shown in FIG. 2.

Load line pocket 30 is also used to connect adjacent gores 24 together. Still referring to FIG. 5, one of the gores 24 is connected to shoulder 31 by means of a row of two thread, zig-zag locking stitches 36. The other adjacent gore 24 is connected to shoulder 32 by another row of two thread, zig-zag locking stitches 38. As can be seen in FIG. 2, load line pocket 30 covers the adjacent edges of adjacent gores 24 and forms a smooth outer surface. As is shown in FIG. 3, the adjacent gores 24 on the inside of the envelope are not overlapped nor do they even touch. For this reason, it is impossible for a tear or run in one of the panels 26 to cross over the load line pocket 30 into the panels 26 of an adjacent gore 24. This provides additional safety and protection against expensive repairs. Furthermore, since the adjacent gores 24 are connected to load line pocket 30 with only one row of stitching, substantial savings in labor are achieved. As is shown in FIG. 3, rows of stitching 29 which connect adjacent panels 24 and the rows of stitching 38 which connect the load line pocket 31 to adjacent gores 24 intersect, thereby adding additional strength to the completed assembly.

Figure 4:
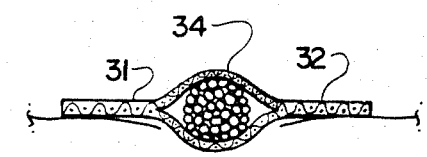
FIG. 4 is a cross-sectional view of the portion of the envelope as shown in FIG. 2, taken substantially along lines 4/4 thereof.

Referring to FIG. 4, a cross-sectional view is illustrated. The tape forming the load line pocket 34 comprises a flat-type double face weave with binding yarns securing the two faces together on its laterally opposing sides to define the shoulders 31 and 32. Binding yarns are omitted in the intermediate portion of the tape between shoulders 31 and 32 to define the tubular pocket 34. The filling yarns extend crosswise from one side of the tape to the other side of the tape and the warp yarns extend along the longitudinal extent of the tape. Alternate filling yarns are positioned on opposite faces of the fabric in the area of the tubular pocket 34 intermediate shoulders 31 and 32. Each set of alternate filling yarns has a separate set of warp yarns for defining the tubular pocket 34, and the opposite faces of the shoulders 31 and 32.

According to the preferred embodiment of the invention, the tape, or load line pocket 30, is constructed of webbing of 100%, 1000 denier polyester yarn. The webbing is woven on a needle loom with a construction of approximately 24 picks per inch and approximately 50 warp ends per inch. A locking stitch is formed on each edge to prevent unravelling. The weave is a form of modified, two-by-two box weave; but, because it has a double face, the loom effectively weaves like a one-by-one weave on the top face and a one-by-one weave on the bottom face. Separate binding stitch yarns connect the faces together to form shoulders 31 and 32. As is apparent, it is very important for the load line pocket 30 to be as abrasion resistant as possible. Abrasion resistance may be built into the load line pocket 30 by the fiber used so that, for example, nylon or aramid fibers may be used instead of polyester based upon the precise characteristics desired. In addition, the load line pocket may be chemically treated to enhance its durability, firmness and abrasion resistance. According to one embodiment of the invention, a chemical bath is formed of acrylic latex, melamine formaldehyde, polyvinyl acetate, silicone with appropriate catalysts. Those ordinarily skilled in the art will appreciate the qualities and characteristics imparted to synthetic fibers by these chemicals and will also appreciate that wide variations in the percentages of the various chemicals may be made in order to vary the durability, firmness and abrasion resistance of the load line pocket. After the chemical bath has been applied to the load line pocket, the webbing is then heat treated to set both the yarns and chemicals.

The result is an exceedingly durable load line pocket 34 which is nevertheless light in weight and which permits easy insertion and removal of the load line 18. As a result of the woven structure of the load line pocket 30, it is no longer necessary to form the load line pocket by two parallel, spaced-apart rows of stitching. Thus, the chances of creating an out-of-specification load line are greatly reduced. To remove and replace a panel 26 or gore 24 it is necessary only to remove a single row of stitching, such as row 36, from adjacent load line pocket 34. The repaired or replacement gore 24 is inserted and again, a single row of stitching 36 is inserted.

A one-piece load line pocket for a balloon, a balloon envelope and a hot air balloon having a one-piece load line pocket is described above. Various details of the invention may be changed without departing from its scope. Furthermore, the foregoing description of a preferred embodiment of the apparatus and method according to the present invention is provided for the purpose of illustration only and not for the purpose of limitation—the invention being defined by the claims.

I claim:
1. An inflatable envelope for a balloon, comprising:
   (a) a plurality of relatively lightweight fabric gores which, when assembled and expanded, collectively have a generally spherical configuration;
   (b) a one-piece load line pocket comprising an elongate fabric tape generally coextensive in length with said fabric gores, one of said tapes being positioned between adjacent gores around the circumference of the envelope for connecting two adjacent fabric gores together in non-overlapping relation, each said tape including;
   (c) a pair of opposing, longitudinally extending shoulders, each one of said pair of said shoulders stitched to the respective adjacent gore along the length thereof thereby securing the gores in a closely adjacent relation to each other but free from a direct interconnection therebetween for affecting a structural joining of adjacent gores; and,
   (d) a longitudinally extending, tubular pocket intermediate to and integrally formed with said pair of shoulders for freely enclosing a load line which extends from the top to the bottom of the balloon envelope and supports a balloon carriage,
whereby load lines can be easily and quickly inserted in and removed from said load line pockets whether or not secured to said gores and with a minimum of stitching, and further whereby destructive tearing of said gores is isolated on one panel by providing no interconnection between adjacent gores.

2. An inflatable envelope for a balloon according to claim 1, wherein said tape comprises a flat-type double face weave with binding yarns securing the two faces together on its laterally opposed sides to define said longitudinally extending shoulders, and without binding yarns securing the two faces together intermediate said shoulders to define said tubular pocket.

3. An inflatable envelope for a balloon according to claim 2 wherein said binding yarns run longitudinally through the warp of said tape.

4. An inflatable envelope for a balloon according to claim 1 wherein said tape includes an abrasion resistant finish which is chemically bonded to said fabric to prevent separation of said tape upon being flexed or stretched.

5. A hot air balloon, comprising:
   (a) a plurality of relatively lightweight fabric gores which, when assembled and expanded, collectively have a generally spherical configuration;
   (b) a one-piece load line pocket comprising an elongate fabric tape generally coextensive in length with said fabric gores, one of said tapes being positioned between adjacent gores around the circumference of the envelope for connecting two adjacent gores together in nonoverlapping relation, each said tape including:
   (c) a pair of opposing, longitudinally extending shoulders, each one of said pair of said shoulders stitched to the respective adjacent gore along the length thereof thereby securing the gores in a closely adjacent relation to each other but free from a direct interconnection therebetween for affecting a structural joining of adjacent gores; and
   (d) a longitudinally extending, tubular pocket intermediate to and integrally formed with said pair of shoulders for freely enclosing a load line which extends from the top to the bottom of the balloon envelope and supports a balloon carriage,
   (e) a carriage mounted below the balloon envelope by the load lines for supporting a crew; and,
   (f) heating means mounted to said carriage for heating the air within the envelope,
whereby load lines can be easily and quickly inserted in and removed from said load line pockets whether or not secured to said gores and with a minimum of stitching, and further whereby destructive tearing of said gores is isolated on one panel by providing no interconnection between adjacent gores.

6. A hot air balloon according to claim 5 wherein said tape comprises a flat-type double face weaved with binding yarns securing the two faces together on its laterally opposed sides to define said longitudinally extending shoulders, and without binding yarns securing the two faces together intermediate said shoulders to define said tubular pocket.

* * * * *